(12) United States Patent
Shiue et al.

(10) Patent No.: US 7,696,729 B2
(45) Date of Patent: Apr. 13, 2010

(54) CONFIGURABLE POWER TANK

(75) Inventors: Lih-Ren Shiue, Hsinchu (TW);
Min-Chu Chen, Sugar Land, TX (US);
Harumoto Nishikawa, Tokyo (JP);
Willis F. Chen, Sugar Land, TX (US)

(73) Assignee: Advanced Desalination Inc., Sugar Land, TX (US)

( * ) Notice: Subject to any disclaimer, the term of this patent is extended or adjusted under 35 U.S.C. 154(b) by 107 days.

(21) Appl. No.: 11/415,231

(22) Filed: May 2, 2006

(65) Prior Publication Data
US 2007/0258188 A1 Nov. 8, 2007

(51) Int. Cl.
*H02J 7/00* (2006.01)
(52) U.S. Cl. .................................. 320/166; 320/167
(58) Field of Classification Search ................ 320/104, 320/117, 166, 167, 124, 130
See application file for complete search history.

(56) References Cited

U.S. PATENT DOCUMENTS

| | | | | |
|---|---|---|---|---|
| 3,663,938 A | * | 5/1972 | Baer | 320/130 |
| 3,718,848 A | * | 2/1973 | Hines | 320/117 |
| 3,919,492 A | * | 11/1975 | Borland | 379/418 |
| 4,202,033 A | * | 5/1980 | Strobel | 436/183 |
| 4,714,868 A | * | 12/1987 | Maruyama et al. | 320/101 |
| 4,731,051 A | * | 3/1988 | Fischell | 604/67 |
| 5,146,095 A | | 9/1992 | Tsuchiya et al. | 290/38 |
| 5,191,325 A | | 3/1993 | Chovin et al. | 340/825.83 |
| 5,446,641 A | | 8/1995 | Reynolds et al. | 363/17 |
| 5,460,658 A | | 10/1995 | Nakagawa et al. | 134/42 |
| 5,545,933 A | | 8/1996 | Okamura et al. | 307/109 |
| 5,572,108 A | * | 11/1996 | Windes | 320/167 |
| 5,581,454 A | | 12/1996 | Collins | 363/59 |
| 5,604,426 A | | 2/1997 | Okamura et al. | 323/282 |
| 5,663,628 A | | 9/1997 | Fujii | 320/1 |
| 5,734,205 A | | 3/1998 | Okamura et al. | 307/110 |
| 5,811,205 A | | 9/1998 | Andrieu et al. | 429/137 |
| 5,856,907 A | | 1/1999 | Gabbai | 361/321.5 |
| 6,016,049 A | * | 1/2000 | Baughman et al. | 320/167 |
| 6,181,545 B1 | | 1/2001 | Amatucci et al. | 361/502 |
| 6,187,061 B1 | | 2/2001 | Amatucci et al. | 29/25.03 |
| 6,245,847 B1 | | 6/2001 | Green et al. | 524/418 |
| 6,355,990 B1 | * | 3/2002 | Mitchell | 307/64 |
| 6,356,055 B1 | * | 3/2002 | Lin et al. | 320/116 |
| 6,423,454 B1 | | 7/2002 | Heider et al. | 429/345 |
| 6,454,816 B1 | | 9/2002 | Lee et al. | 29/25.03 |
| 6,464,459 B2 | | 10/2002 | Illingworth | 415/208.2 |
| 6,510,043 B1 | | 1/2003 | Shiue et al. | 361/502 |
| 6,512,667 B2 | | 1/2003 | Shiue et al. | 361/502 |
| 6,552,895 B1 | | 4/2003 | Vassallo et al. | 361/517 |

(Continued)

*Primary Examiner*—Edward Tso
*Assistant Examiner*—Arun Williams
(74) *Attorney, Agent, or Firm*—Ming Chow; Sinorica, LLC

(57) ABSTRACT

A plurality of supercapacitor elements is arranged in rows and columns within a single housing. The elements have no physical connection until they are configured into series, parallel or combinatory matrix by a configuration circuit composing of switches, a driver and a controller. Under the manipulation of the configuration circuit, the elements can be assembled in a broad voltage range to deliver the desired powers to automobiles, heavy machineries, power tools, appliances, or consumer electronics in real-time responses. When the loads present energy for recovery, the elements can also be immediately grouped in the voltage and capacity ranges corresponding to the power levels of the energy to be harvested. Using the present invention, the efficiency of DC and AC energy utilization can be significantly improved.

13 Claims, 5 Drawing Sheets

U.S. PATENT DOCUMENTS

| | | | |
|---|---|---|---|
| 6,579,327 B1 | 6/2003 | Shiue et al. | 29/25.03 |
| 6,580,598 B2 | 6/2003 | Shiue et al. | 361/502 |
| 6,602,742 B2 | 8/2003 | Maletin et al. | 438/142 |
| 6,616,875 B2 | 9/2003 | Lee et al. | 264/105 |
| 6,624,535 B2 | 9/2003 | Morrow | 307/71 |
| 6,624,613 B2 * | 9/2003 | Kitagawa | 320/124 |
| 6,645,675 B1 | 11/2003 | Munshi | 429/305 |
| 6,650,091 B1 | 11/2003 | Shiue et al. | 320/166 |
| 6,661,643 B2 | 12/2003 | Shiue et al. | 361/502 |
| 6,664,766 B2 * | 12/2003 | Desprez et al. | 320/167 |
| 6,678,147 B2 | 1/2004 | Shiue et al. | 361/502 |
| 6,680,548 B2 | 1/2004 | Shiue et al. | 307/141 |
| 6,697,249 B2 | 2/2004 | Maletin et al. | 361/502 |
| 6,753,673 B2 | 6/2004 | Shiue et al. | 320/166 |
| 6,762,926 B1 * | 7/2004 | Shiue et al. | 361/502 |
| 6,794,083 B2 | 9/2004 | Schmidt et al. | 429/188 |
| 6,795,298 B2 | 9/2004 | Shiue et al. | 361/508 |
| 6,806,679 B2 | 10/2004 | Yang | 320/107 |
| 6,815,119 B2 | 11/2004 | Schmidt et al. | 429/188 |
| 6,836,098 B1 | 12/2004 | O'Brien | 320/166 |
| 6,841,301 B2 | 1/2005 | Heider et al. | 429/199 |
| 6,841,304 B2 | 1/2005 | Michot et al. | 429/307 |
| 6,870,196 B2 | 3/2005 | Strip | 257/79 |
| 6,893,774 B2 | 5/2005 | Schmidt et al. | 429/189 |
| 6,947,855 B2 | 9/2005 | Verbrugge et al. | 702/63 |
| 6,962,666 B2 | 11/2005 | Ravet et al. | 252/506 |
| 6,963,796 B2 | 11/2005 | Larson et al. | 701/36 |
| 6,965,509 B2 | 11/2005 | Reynolds et al. | 361/528 |
| 6,984,295 B2 | 1/2006 | Shiue et al. | 204/230.8 |
| 6,985,142 B1 | 1/2006 | Svensson et al. | 345/211 |
| 6,995,480 B2 | 2/2006 | Amano et al. | 307/10.1 |
| 6,998,193 B2 | 2/2006 | Sun | 429/247 |
| 7,000,042 B1 | 2/2006 | Burns et al. | 710/104 |
| 7,002,112 B2 | 2/2006 | Kishi et al. | 219/482 |
| 7,221,187 B1 * | 5/2007 | Snyder et al. | 326/41 |
| 7,275,501 B1 * | 10/2007 | Laceky | 119/57.92 |
| 2002/0177021 A1 * | 11/2002 | Fuglevand | 429/23 |
| 2003/0026092 A1 * | 2/2003 | Reese et al. | 362/183 |
| 2003/0062876 A1 * | 4/2003 | Desprez et al. | 320/167 |
| 2003/0214270 A1 * | 11/2003 | Shiue et al. | 320/166 |
| 2003/0231007 A1 * | 12/2003 | Nourai et al. | 320/166 |
| 2004/0036449 A1 * | 2/2004 | Bean et al. | 320/166 |
| 2006/0071645 A1 * | 4/2006 | Bolton | 320/166 |
| 2006/0194102 A1 * | 8/2006 | Keshishian et al. | 429/160 |
| 2006/0208572 A1 * | 9/2006 | Zansky et al. | 307/66 |
| 2006/0232238 A1 * | 10/2006 | Horii | 320/104 |
| 2008/0309295 A1 * | 12/2008 | Kotz et al. | 320/167 |

* cited by examiner

CONFIGURABLE POWER TANK

BACKGROUND OF THE INVENTION

1. Field of the Invention

This invention relates generally to configurable power tank for power delivery and storage and, more particularly, to a plurality of supercapacitor elements arranged in rows and columns in a single housing with an integrated configuration circuit. The latter can configure the elements in real-time responses to fulfill power demands and to save recoverable power.

2. Description of the Related Art

Energy efficiency is a crucial issue, especially, in the era of high oil prices and quick depletion of petroleum depositories. Industries from automobile and electric locomotive to semiconductor to utility have dedicated a lot of resources to improve the energy efficiency of manufacturing processes and products. Due to the assistance of batteries, the hybrid cars generate better energy efficiency and gas mileage than the comparable regular gas models. One of the gas-saving factors of hybrids is that the battery can be used to retrieve the residual energy of the vehicles in regenerative braking. There is no such energy recovering capability in the regular gasoline cars. However, all batteries rely on specific chemical reactions for energy delivery and energy storage known as discharging and charging, respectively. The kinetic and thermodynamic characteristics of the foregoing energy conversions often restrict the power capacity, charge and discharge efficiency, as well as lifetime of batteries. In power delivery and storage for high-power applications, batteries are inadequate because of the chemical nature.

Energy in the form of electricity is directly stored and released in capacitors via various physical processes. Among them, surface adsorption and de-sorption are the mechanisms of energy storage and energy delivery, respectively, for electrolytic capacitors. The electrodes of the capacitors adsorb ions from an electrolyte at charging, while the stored energy is delivered with automatic de-sorption of ions at discharging. Due to the complete reversibility and fast response of physical processes, the capacitors have long life, high power density, as well as good energy efficiency at charging and discharging. Assuming the unique properties of an electrolytic capacitor, the supercapacitor advances the application of capacitor to a higher level of power provision by offering hundreds to thousands times more energy content of those of conventional capacitors.

Though the energy content of today's supercapacitor is still no match to the battery, the former is used to improve the power density and lifetime of battery. The foregoing enhancement of battery power and lifetime is known as the load leveling effect. Numerous applications of the load leveling effect have been patented, for example, U.S. Pat. Nos. 5,146,095; 5,545,933; 5,604,426; 5,663,628; 5,734,205; 6,995,480 and 7,002,112, just to name a few.

In all previous work with supercapacitor-related applications, the capacitor can only provide one delivery of one peak power. Then the capacitor requires a refill of energy for the second round of power provision. As shown in FIG. 1, the supercapacitor may discharge from Vs, the fully charged level ST, to 0 volts. Then, it may take a period from $T_1$ to $T_2$ for refilling the capacitor to Vs for delivering power again. Thus, the power delivery of the conventional use of supercapacitor is intermittent. Such power outrage is clearly unacceptable to many high-power applications.

Furthermore, as the voltage of the supercapacitor drops below the threshold voltage level TH to drive a load, the residual energy of the capacitor becomes ineffective due to insufficient driving force. This ineffective energy will be discharged and refilled without contribution to the work of the capacitor. In the repetitive charge and discharge of supercapacitor, a great amount of energy is wasted. To compensate the ineffective energy, supercapacitor is commonly over-designed for power applications resulting in high cost. This, in turn, is why it needs a method to improve its power management more efficiently and economically. Another problem in the use of supercapacitor is that many well-packaged capacitors are connected in series for producing the needed output voltages. When the module is charged or discharged in series, there is always an imbalance of voltage distribution among the members in the pack. To overcome the uneven distribution of voltage, each capacitor is assigned a protection circuit. Henceforth, an effective and economical method of cell assembly of the power tank supercapacitor modules for the power applications is needed as well.

SUMMARY OF THE INVENTION

High efficiency for the utilization of DC and AC energies through wireless transmission or direct or indirect electromagnetic induction is the ultimate goal of the present invention. The following objectives may serve as the required components to reach the target.

1. Supercapacitor elements (i.e. so-called Power Tank) are fabricated using concentric winding of electrodes and separators into cylindrical or oval rolls. Each element is equipped with two oppositely oriented electrical leads for charging and discharging. The electrodes of each element are identical in chemistry composition so that the leads have no fixed polarity. Interchangeable use of the leads as positive or negative pole is allowable. Each lead of every element has a designated lead-switch, and the element also has a designated element switch. The element-switch has lower electrical resistance than that of the lead-switch.

2. A plurality of supercapacitor elements are arranged in rows and columns with a single plastic or metal housing. The elements have no physical connection, but they can be facilely configured into a desirable matrix through the switches under the command of a configuration circuit.

3. Any supercapacitor element wherever it is located in the housing can be grouped into a configuration for delivering the required powers, or for harvesting any available wired or wireless power source. Once the mission is completed, the supercapacitor elements are returned to a discrete state.

4. In addition to the switches, the configuration circuit includes a controller and a driver. The functions of each component are as follows:

(1) Switch—to form electronic paths required for configuration;
   (2) Controller—to monitor, register, calculate, decide, manage, and command;
   (3) Driver—to execute the commands from the controller;

5. During the power-delivery mode, a CD swing switches between two groups of supercapacitor elements for charging and discharging. At all times, there is one group is discharging while the other group is charging (or recharging). The two groups switch the positions of charging and discharging in the next cycle and thereafter until the power demand is satisfied. No more than the effective energy of the elements is consumed and refilled.

6. The supercapacitor is used as a power amplifier to amplify the output power of DC and AC charging sources through wire or wireless methods to many folds in both voltage and current without the help of transformer, converter or step-up circuit.

7. The configuration circuit is fabricated as a printed circuit board that is located on the outer or inner surface of the housing cover depending on the application needs. The supercapacitor elements are integrated with the configuration circuit into compact and sustainable systems for smartly performing dual functions, that is, power delivery and power storage.

With the configurable system, powers of a broad range of voltage and current can be supplied to miscellaneous loads, and any recoverable energy of the loads can be harvested through wires or wirelessly. It is the prompt provision of power and unlimited recuperation of power that the efficiency of energy use is improved.

DETAILED DESCRIPTION OF THE EMBODIMENTS

The preferred embodiments of the present invention are described in detail by referring to the accompanying diagrams.

Figure 2:
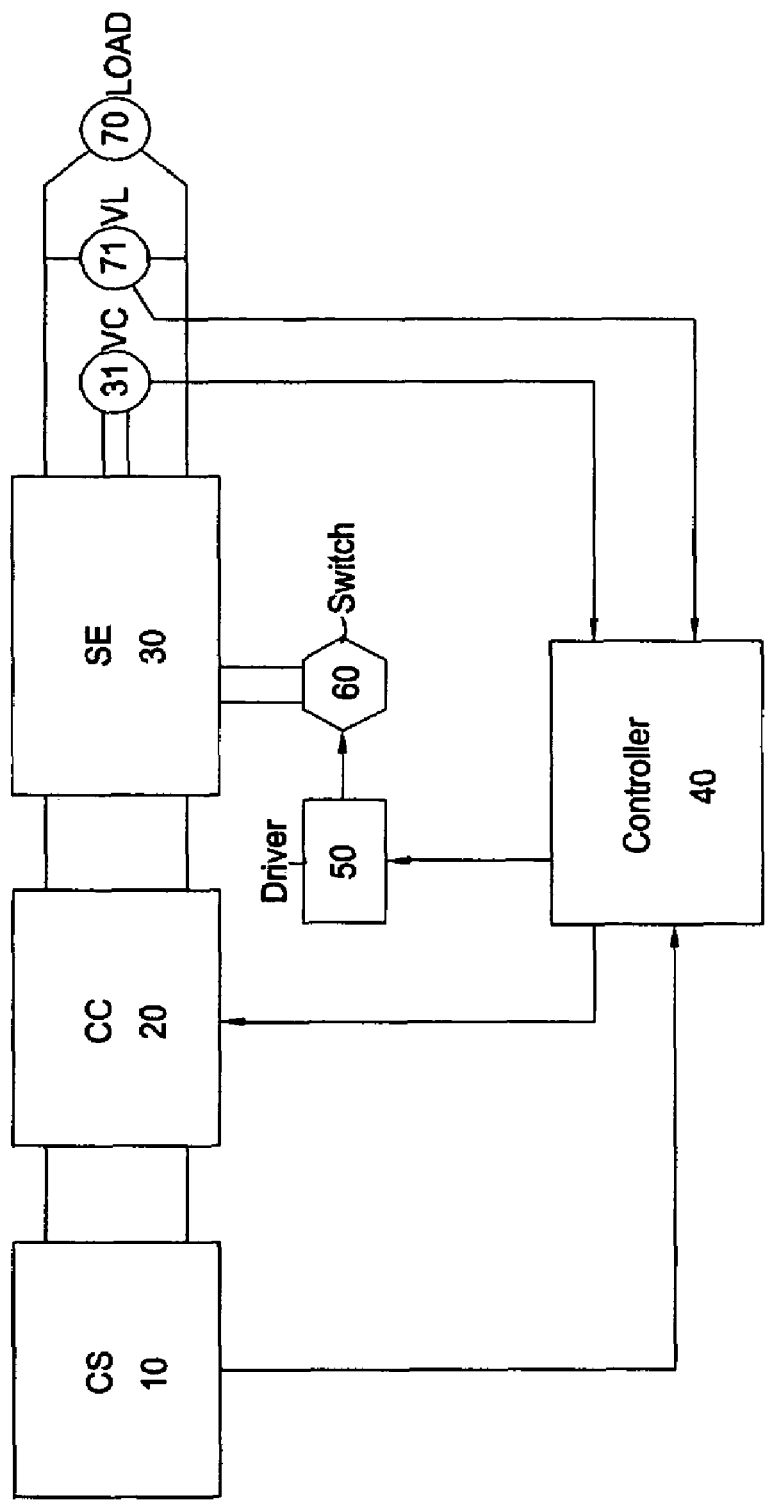
FIG. 2 is a block diagram of a configurable power delivery and storage system.

FIG. 2 shows a block diagram of a configurable power delivery and storage system. The configurable power delivery and storage system consists of a configurable array of supercapacitor elements (SE) 30, controller 40, driver 50, and switch 60. The supercapacitor elements 30 is attached with a representative voltage sensor ($V_C$) 31, for communicating with the controller 40 to monitor and register the state of charge of each element in supercapacitor elements 30. Based on the power demand of the LOAD 70 was measured by the voltage sensor ($V_L$) 71, the controller 40 will correspondingly configure the elements in supercapacitor elements 30, through the driver 50 and pertinent switches 60, to deliver the power. If LOAD 70 presents energy for recovery, the controller 40 will conduct a similar configuration of the supercapacitor elements 30 to absorb the energy regardless of the quantity of energy and charging speed.

Charging of the supercapacitor elements 30 is proceeded via charging circuit (CC) 20 that may contain an inverter or rectifier, as known to people skillful in the art. Before the power delivery, the supercapacitor elements 30 should be fully charged by a charging source (CS) 10. The charging source 10 can be a battery, a fuel cell, a solar cell, a wind mill, a generator, an engine or utility grid through direct or indirect electromagnetic induced wireless transmission. As long as the charging source 10 has a higher voltage than the supercapacitor elements 30, the latter can be charged upon a charging signal sent from the controller 40 to charging circuit 20.

The controller 40 is the brain of the configurable system for performing the following duties:

1. To monitor and register the state of the charge of the supercapacitor elements 30 and to maintain the supercapacitor elements 30 at a fully charged state except when the system is in standby;
2. Based on power demands and recoverable powers, to calculate the number of supercapacitor elements 30 and in what configuration required for the application;
3. To facilely configure the supercapacitor elements 30 in series, parallel or some other combinatory connections required for power delivery or power storage;
4. To select the electrical lead having a higher potential as the positive pole of that supercapacitor element 30;
5. After a long stand, to assemble the supercapacitor elements 30 with sufficient remnant of power for the ignition of automobiles, or for the actuations of machineries;
6. To exclude failed supercapacitor elements 30 from the controller's configuration; and
7. To manage when to perform the Charging-Discharging swing (termed as CD swing).

Then, the driver 50 and switches 60 serve as the arms and legs of the controller 40 to carry out the configurations.

Figure 3:
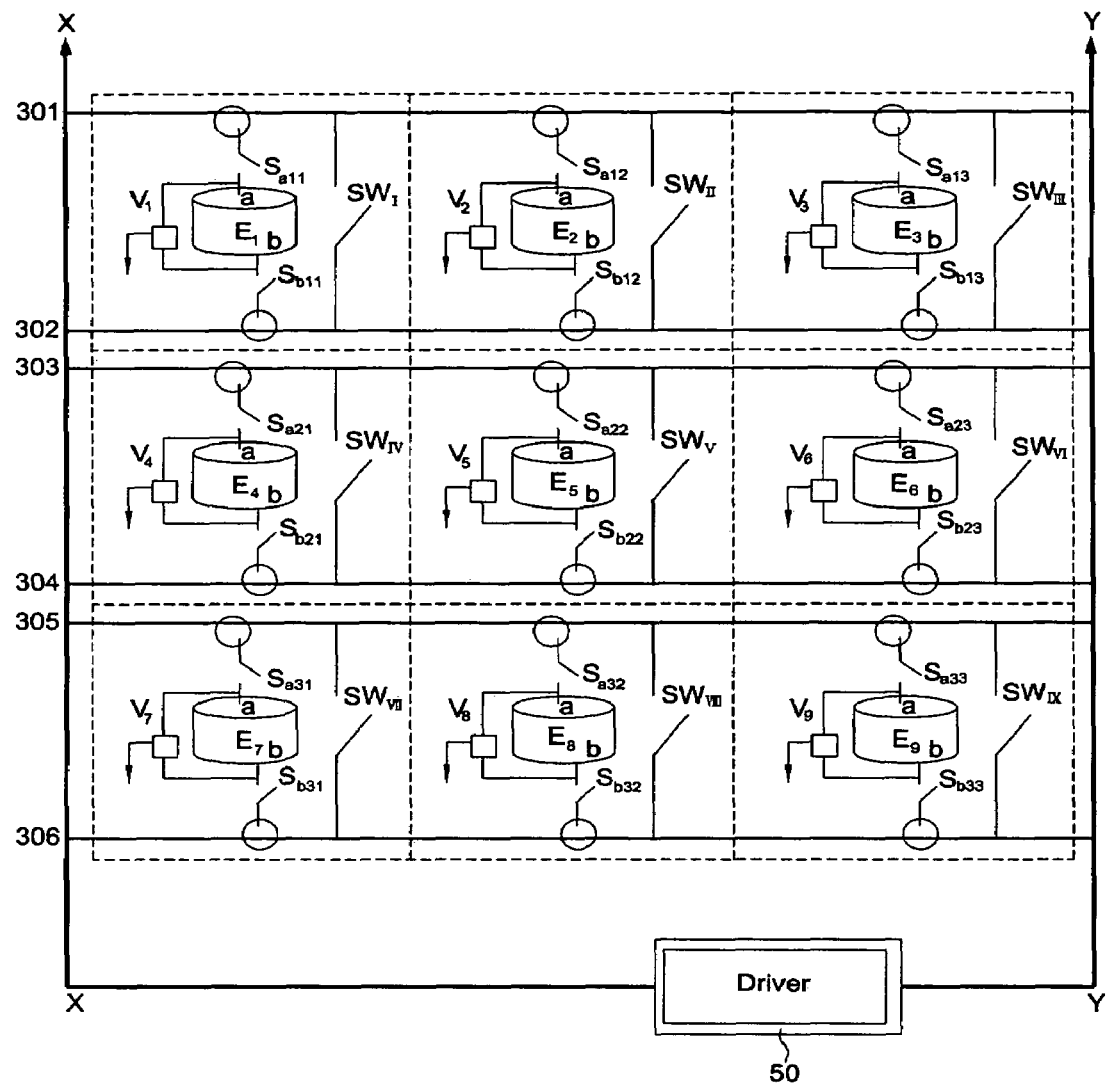
FIG. 3 is a diagram of the arrangement of nine supercapacitor elements (typical Power Tank arrangement).

Nine supercapacitor elements 30, $E_1$ to $E_9$, are arranged in rows and columns within a single housing body denoted by dot lines in FIG. 3. Other numbers of array can be deployed in a similar way. A supercapacitor element, e.g. $E_1$, is defined as an assembly of two electrodes typically, and two electrolyte-soaked separators wrapped or stacked together, wherein each electrode is followed by a lead-switch (e.g. $S_{a11}$, $S_{b11}$) to prevent electrical short.

As shown in FIG. 3, each supercapacitor element, $E_1$ to $E_9$, is placed in a confined compartment with no communication of the electrolyte. Also, each supercapacitor element, $E_1$ to $E_9$, in the drawing has a designated voltage sensor, $V_1$ to $V_9$, a designated element-switch, $SW_I$ to $SW_{IX}$, and two oppositely oriented electric leads, a and b, each is assigned a lead-switch, $S_{a11}$ to $S_{b33}$.

The element-switch SW has a lower electrical resistance than the lead-switch (e.g. $S_{a11}$), and all switches are hooked to horizontal data bus, 301 to 306, so that the switches can be directed by the Driver 40 to form the electronic paths for the required configurations determined by the controller 40 (not shown in FIG. 3). The horizontal data bus (301 to 306) is then connected to the vertical bus XX and YY for power delivery to load, or for energy harvesting from load. Each designated voltage sensor ($V_1$ to $V_9$) can measure the voltage across the two leads (i.e. a and b) of that supercapacitor element as a gauge of the state of charge. The information is constantly updated and stored in the memory of the controller 40 (also not shown in FIG. 3) for latter use in the determination of configuration list.

Assuming $E_1$, $E_2$ and $E_3$ have the same state of charge and they need to join in parallel, the connection is simply completed by closing the six lead switches, $S_{a11}$ to $S_{b13}$. On the other hand, if $E_1$, $E_2$ and $E_3$ need to join in parallel, in addition to the foregoing closure of six lead switches, two element switches, $SW_I$ and $SW_{II}$, have to be closed. Assuming all leads a are the positive pole, electricity in the series module $E_1$-$E_2$-$E_3$ will flow as: $E_1a \rightarrow E_1b \rightarrow$ bus $302 \rightarrow SW_I \rightarrow$ bus $301 \rightarrow E_2a \rightarrow E_2b \rightarrow$ bus $302 \rightarrow SW_{II} \rightarrow$ bus $301 \rightarrow E_3a \rightarrow E_3b$. The foregoing configurations demonstrate the configuring ability of the supercapacitor elements only, rather than limiting the application scope of the present invention. There are many modifications on the configuration of an array of elements. Much more sophisticated addressing and configuring examples can be found in U.S. Pat. No. 7,000,042 for expanding memory for communication, in U.S. Pat. No. 5,191,325 for clock controls and event counting, as well as in U.S. Pat. No. 6,870,196 for configuring organic light emitting diodes (OLED) for display.

For a range of operational voltage outputs, supercapacitors are switched in U.S. Pat. Nos. 7,002,112 and 5,545,933, and batteries are switched in U.S. Pat. No. 6,624,535. These works focus on the power delivery only, whereas power storage using a configurable system appears neglected. There are many situations where regenerated energy or residual energy is worth retrieving. This can be seen in the regenerative braking of elevator in U.S. Pat. No. 6,460,658, and in the polarity reversal of liquid crystal display (LCD) elements in U.S. Pat. No. 6,985,142. Energy efficiency can be realistically improved by a real-time supply of power whenever a demand occurs, as well as by unrestricted and corresponsive absorption of energy. In lieu of no energy conversion and free polarity, supercapacitor is an ideal device for making a dual function system as the present invention. An array as FIG. 3 shares the same assembly as U.S. Pat. No. 6,762,926, which is currently owned by the assignee. By integrating the supercapacitor elements 30 within a single housing, the elements will turn into a homogeneous unity due to (a) All elements have the same temperature and vapor pressure environments, and
(b) The electrical resistances of all connections are low because of close proximity.

While the integrated module is compact, less encapsulation material cables and connectors are consumed.

The housing for the integrated module displayed in FIG. 3 can be plastic, such as polyethylene or polypropylene, or metal such as aluminum and stainless steel. Another method to reduce the modular size of FIG. 3 even further is using bipolar electrodes in the fabrication of supercapacitor elements as described in U.S. Pat. No. '926, as well as in U.S. Pat. Nos. 6,510,043 and 6,579,327. The bipolar supercapacitor element has at least two times of working voltage of the regular supercapacitor elements, which are 2.5 to 3.0V on using organic electrolytes. With the elements of high unitary working voltage, the number of cells required to make the module of FIG. 3 can be reduced by more than 50%.

Similar to the integration of supercapacitor elements in a single housing, the configuration circuit can be first made into a printed circuit board (PCB). According to application needs, the PCB can be located on the outer or inner surface of the cover of the housing body. After a hermetic joint of the cover with the housing body, a compact and sustainable power system is made, and it is ready to work with many DC and AC wired or wireless charging sources for a power supply, as well as for power saving, in a broad operational voltage range for many high-power applications including transportation, communication and recreation.

Figure 1:
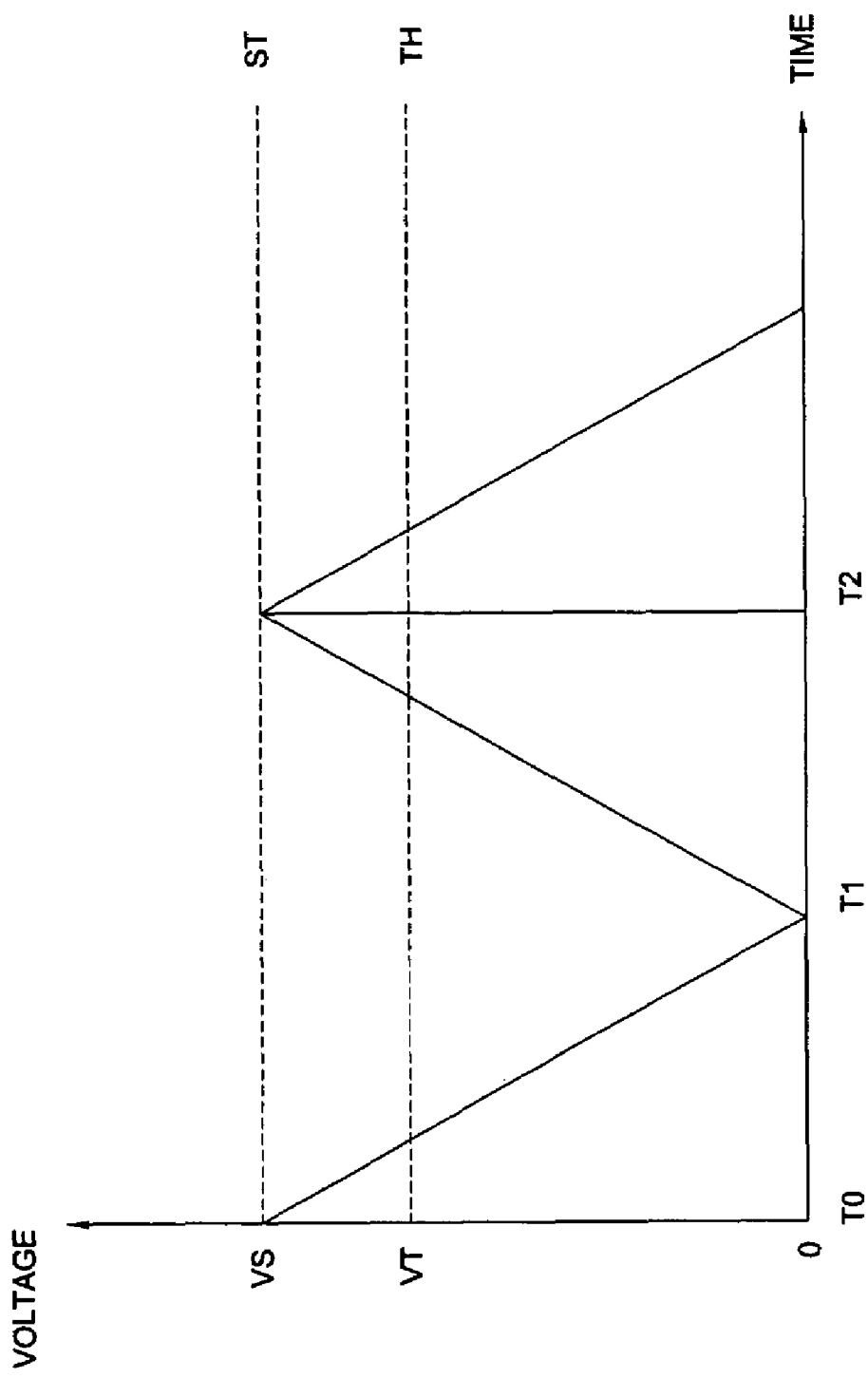
FIG. 1 is a diagram of a discharge curve of a single capacitor or supercapacitor.
Figure 4:
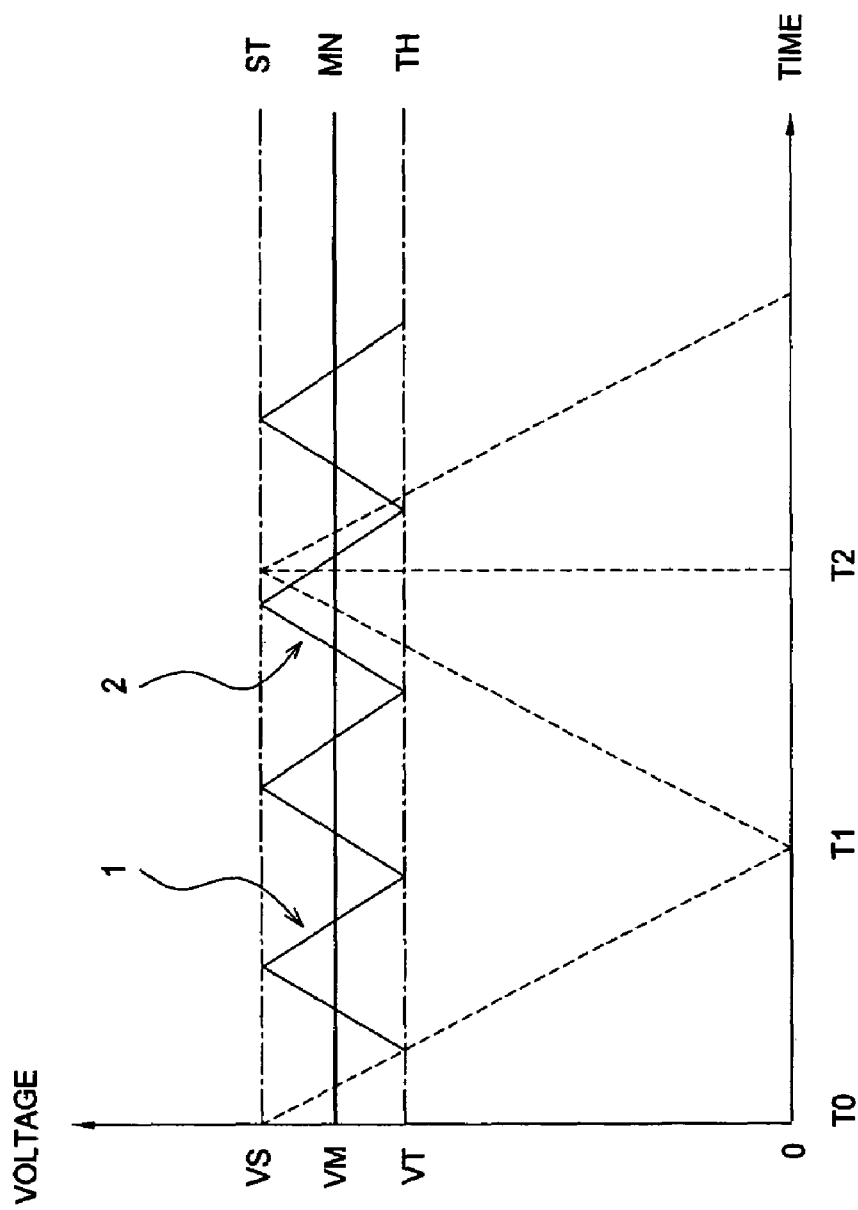
FIG. 4 is a diagram of a discharge curve with two groups of supercapacitor elements with the CD swing.

As shown in FIG. 1, there is a great amount of energy wasted in the conventional use of supercapacitor. FIG. 4 presents a solution to the wasteful use of energy by switching between two groups of supercapacitors, 1 and 2, between charging and discharging (i.e. CD swing). The CD swing is limited between the fully charged level of supercapacitor ST and the threshold level TH to drive a load. Depending on the power demands, the two groups, 1 and 2, may contain a single element, or multiple supercapacitor units. Only the effective energy of the capacitor is consumed at discharging, and the same amount of energy is refilled at charging. In one cycle, as the voltage of group 1 is discharged to $V_T$, it will immediately undergo charging (or recharging) and group2 will assume the discharging. Group1 and group2 will switch between the positions of charging and discharging in the next cycle and beyond until the power demand is ceased. Under the CD swing, a non-zero output voltage level MN is provided. Since MN is above TH, the load will receive a consistent power supply. Not only is there no power outrage, but the energy efficiency of the CD swing will be high due to the effective energy consumed. By narrowing the swing gap, that is, the distance between line ST and line TH, or by increasing the switching frequency, the level of MN will be more stable.

In reality terms, using the present invention for automobiles regardless of hybrid or gasoline models, the cars will increase the energy efficiency to increase gas mileage through the improvement of power management than without the configurable power system. FIG. 4 is only one embodiment of applying the present invention for power delivery. The following example will demonstrate how the CD swing can save energy.

EXAMPLE

Figure 5:
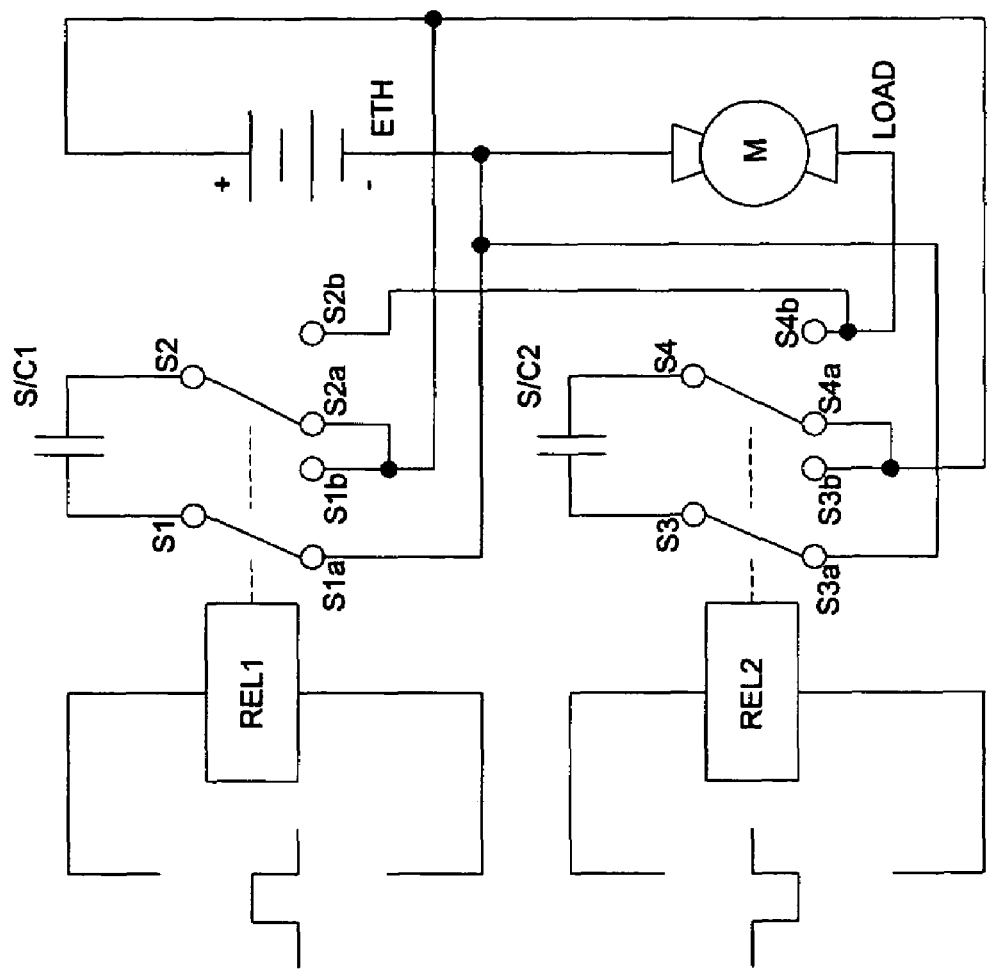
FIG. 5 is a diagram of an application circuitry using relays for the CD swing.

FIG. 5 shows an implementation of the CD swing using two relays, REL1 and REL2. Two groups of supercapacitor, S/C1 and S/C2, with electrical leads S1/S2 and S3/S4, respectively, are switching by the relays in FIG. 5. Each relay is a double-pole double-throw (DPDT) mechanical switching device. At the beginning CD swing, the two relays REL1 and REL2 at the normally closed state as shown in FIG. 5, and both supercapacitors S/C1 and S/C2 will be charged in parallel by battery ETH. The flow of electricity in the charging each capacitor is as follows:

S/C1: (+) pole of ETH→$S_{2a}$→S2→S1→$S_{1a}$→(−) pole of ETH

S/C2: (+) pole of ETH→$S_{4a}$→S4→S3→$S_{3a}$→(−) pole of ETH

Since S2 of S/C1 and S4 of S/C2 are electrically connected to the (+) pole of ETH, thus, S2 and S4 become the (+) pole, whereas S1 and S3 are the (−) pole of the respective capacitor. Once the switching button (not shown in FIG. 5) is depressed, the two relays REL1 and REL2 will be switched between "close" and "open" states accompanied with the switching of S/C1 and S/C2 between discharging and charging. The operation of CD swing is as follows:

1. The First Cycle

REL1 is on ("open" state) and REL2 is off ("close" state), S1 and S2 of S/C1 are switched to $S_{1b}$ and $S_{2b}$, respectively. Because $S_{2b}$ is connected to load M, thus, S/C1 will discharge to the load. Power is delivered with the electricity flow: (+) pole of ETH→$S_{1b}$→S1→S2→$S_{2b}$→M As a result, S/C1 is discharged in series with battery ETH, and the power will be mainly delivered by the capacitor. On the other hand, S/C2 is still in parallel connection with the battery for charging due to the "close" state of REL2. However, S/C2 consumes no energy for it is not connected to M.

2. The Second Cycle

REL1 is off ("close" state) and REL2 is on ("open" state), S3 and S4 of S/C2 are switched to $S_{3b}$ and $S_{4b}$, respectively. Because $S_{4b}$ is connected to load M, thus, S/C2 will discharge to the load. Power is delivered with the electricity flow: (+) pole of ETH→$S_{3b}$→S3→S4→$S_{4b}$→M As a result, S/C2 is also discharged in series with battery ETH.

Because REL1 is in the "close" state, S/C1 will be in parallel connection with the battery for refilling the energy consumed.

3. The Third and Further Cycles

A consistent power will be delivered to M from the reciprocal switching of REL1 and REL2 until the switching button is turned off when M demands no power.

Proof of Performance

An electric wheelchair is used as a vehicle to test the performance of the CD swing using the circuitry of FIG. 5.

Power A: 2 pieces lead-acid (Pb-A) batteries, each has a power rating of

12V×12 Ah connected in series

Power B: 1 piece of the original Pb-A+circuitry of FIG. 5 wherein

S/C1 and S/C2 have the same energy capacity, 15V×5 F

In each test, the Pb-A is fully charged and the vehicle is driven by a test driver weighed 180 lb until the cut-off voltage of Pb-A. Three tests are taken for each power system, and the run times of the vehicle are recorded at the end of battery use-time. The average of the run times and end voltages are shown in Table 1:

TABLE 1

Comparison of Power Supply With and Without CD Swing

| Power | Average Run Time | Average End Voltage |
|---|---|---|
| A | 98 minutes | 9.8 V and 10.8 V |
| B | 75 minutes | 11.5 V |

Several observations can be drawn from Table 1:
1) Even only two batteries are connected in series, power supply A shows that there is an imbalance of voltage distribution: 1 volt difference between the batteries. This is a serious outcome for the battery having the higher voltage will fail quicker resulting in the loss of the pack.
2) The run time of power supply B is about 76.5% (B/A=75/98) of that of power supply A. Nevertheless, the total weight of the wheelchair is reduced, and one battery is saved.
3) The run time per battery for power supply A is 49 min, thus, power supply B is 1.53 times (75/49) use-time of power supply A. The CD swing has improved the energy efficiency of the wheelchair by 53%.
4) Power supply B has a higher end voltage than power supply A indicating that the former has a premature cut off. The reason of early cut-off is that the relays used in FIG. 5 need 12V to drive, which is above the cut-off voltage of the battery. In other words, it is the relays that restrict the use-time of the battery, otherwise, the CD swing can improve the energy efficiency of wheelchair further.
5) During testing, the vehicles required a current output as high as 30 A, which is more than the charging current provided to the supercapacitors. This means that the CD swing can deliver an output power of 720 W. In-house studies have measured the simplified supercapacitor elements (power tank) delivering a much higher power output, for example, 2700~10000 W, and receiving the same level of input power. There is no limitation on the power ratings and power densities of the innovative power tank on power delivery and power storage. By preparing the supercapacitor elements, which have a minimum operation voltage of 2.5V and a minimum capacitance of 1 F, at the desired power level, the power tank can deliver and store an power of 50 W and above for small and very large power applications.

Other switching devices than relay can be used for the CD swing, for example, MOSFET (metal oxide semiconductor field effect transistor) and IGBT (integrated bipolar transistor). Each switching device has advantages and disadvantages. It should be determined by application needs for the selection of switching device for the CD swing. In FIG. 5, the supercapacitor can "single-handedly" amplify the power output of the battery without the help of transformer, converter or step-up circuitry. This is also one of the technical and economical advantages of the present invention. Actually, the configurable power systems of the present invention can be operated as follows for many power applications:

1. Arrange the whole array of supercapacitor elements in many groups of series connection to match the voltage of a charging source. These groups are then connected in parallel for being charged by the potential source. After all elements are charged, they can be regrouped for delivering power to any load that has a different driving voltage from that of the charging source. In other words, the present invention can be used as a power converter between a potential source and a load in a highly efficient and economical way.

2. Using the charged supercapacitor elements as a potential source to support other elements within the housing needed for performing the CD swing for power provisions. Therefore, the present invention can independently perform power provisions without an outside charging source.

3. To serve as a "power tank" for automobiles, laptop computers, power tools, as well as a uninterruptible power supply to medical services, communications, appliances and heavy machineries.

4. To serve as a "power relay" for electricity generation stations. Power generated can be immediately stored in the supercapacitor elements, the capacitors can then transmit the energy to power grids through wires or wirelessly, for example, through electromagnetic flux or microwave emission.

What is claimed is:
1. A configurable power tank, comprising:
a plurality of supercapacitor elements arranged in rows and columns within a single housing body, said plurality of supercapacitor elements connected a charging circuit; and
a configuration circuit located on the outer or inner surface of a housing cover, and an integrated module by joining said housing body with said housing cover hermetically, wherein said configuration circuit configure said supercapacitor elements in a specific connection, and a CD swing switches between two groups of supercapacitor elements for charging and discharging, when one group is discharging while the other group is charging or recharging, and wherein said configuration circuit comprises:
a control means for monitoring, registering, storing, calculating, deciding and commanding;
a switch for providing an electronic paths requires for said configuration circuit;
a plurality of sensors for detecting the charge status of said plurality of supercapacitor elements; and
a driver for executing the command of said control means to configure said plurality of supercapacitor elements through a horizontal data bus.

2. The configurable power tank according to claim 1, wherein each of said plurality of supercapacitor elements includes two electrodes and two separators soaked in an electrolyte.

3. The configurable power tank according to claim 1, wherein said single housing body is made of plastic or metal.

4. The configurable power tank according to claim 1, further comprising a charging source connected with said charge circuit and said configuration circuit.

5. The configurable power tank according to claim 4, wherein said charging source is selected from the group consisting of a battery, a fuel cell, a solar cell, a wind mill, a generator, an engine and a utility grid through direct/indirect electromagnetic induced wireless transmission.

6. The configurable power tank according to claim 1, wherein said specific connection is selected from the group consisting of a series connection, a parallel connection, and some other combinatory connections.

7. A power tank system for delivering and storing power, said power tank system comprising:
   a plurality of supercapacitor groups and a charging source in a parallel connection through reciprocal switching device individually;
   a plurality of relays for enabling said reciprocal switching device individually between open and close states for charging and discharging; and
   a configuration circuit connected with said plurality of relays to configure said plurality of supercapacitor groups through said reciprocal switching device, wherein said plurality of supercapacitor groups are configured to deliver consistent peak powers through said reciprocal switching of said plurality of supercapacitor groups between charging and discharging, and wherein said configuration circuit comprises:
   a control means for monitoring, registering, storing, calculating, deciding and commanding;
   a switch for providing an electronic paths required for said configuration circuit;
   a plurality of sensors for detecting the charge status of said plurality of supercapacitor elements; and
   a driver for executing the command of said control means to configure said plurality of supercapacitor elements through a horizontal data bus.

8. The power tank system according to claim 7, wherein said plurality of supercapacitor group comprises a plurality of supercapacitor elements arranged in rows and columns within a single housing body.

9. The power tank system according to claim 8, wherein said housing body is made of plastic or metal.

10. The power tank system according to claim 7, wherein said configuration circuit located on the outer or inner surface of a housing cover, and an integrated module by joining said single housing body with said housing cover hermetically.

11. The power tank system according to claim 7, wherein said specific connection is selected from the group consisting of a series connection, a parallel connection or some other combinatory connections.

12. The power tank system according to claim 7, wherein said relay is a double-pole double-throw (DPDT) mechanical switching device.

13. The power tank system according to claim 7, wherein said charging source be selected from the group consisting of a battery, a fuel cell, a solar cell, a wind mill, a generator, an engine and a utility grid through direct/indirect electromagnetic induced wireless transmission.

* * * * *